No. 850,674. PATENTED APR. 16, 1907.
C. W. & A. E. PARKS.
COMPRESSED AIR SPRAYER.
APPLICATION FILED SEPT. 9, 1905.
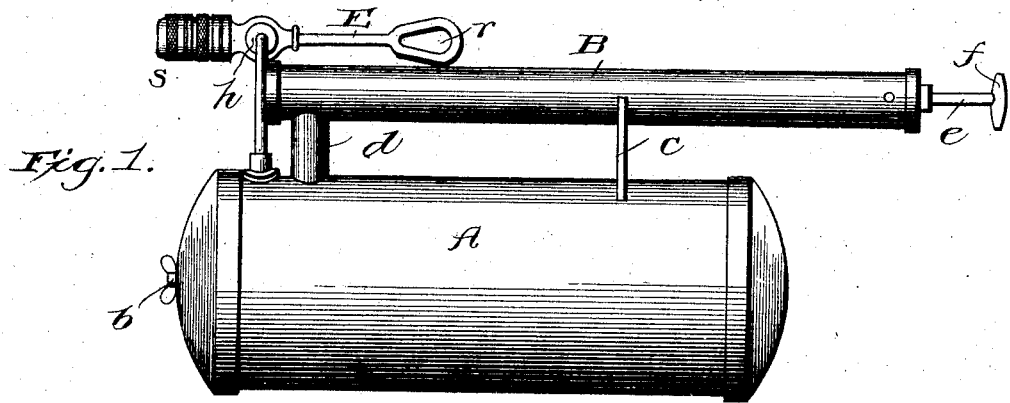
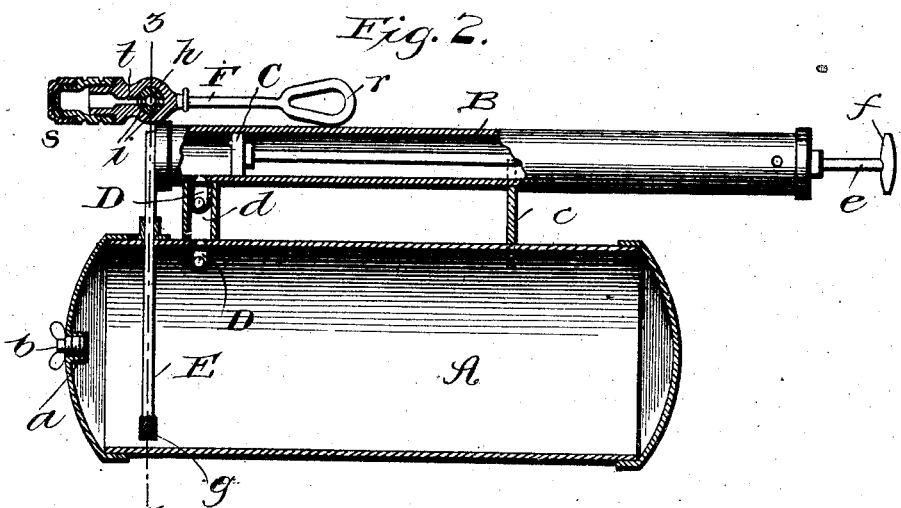
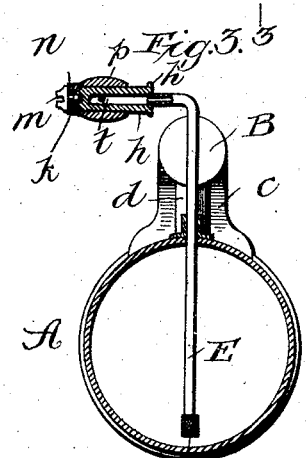
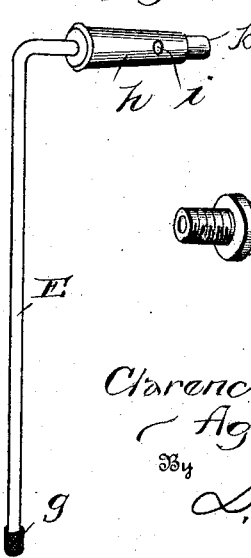
Inventors
Clarence W. Parks and
Agnes E. Parks
By
Attorney
Witnesses

UNITED STATES PATENT OFFICE.

CLARENCE W. PARKS AND AGNES E. PARKS, OF LOWELL, MICHIGAN.

COMPRESSED-AIR SPRAYER.

No. 850,674.　　　　　Specification of Letters Patent.　　　Patented April 16, 1907.

Application filed September 9, 1905. Serial No. 277,759.

*To all whom it may concern:*

Be it known that we, CLARENCE W. PARKS and AGNES E. PARKS, citizens of the United States, and residing at Lowell, in the county of Kent and State of Michigan, have invented certain new and useful Improvements in Compressed-Air Sprayers, of which the following is a specification.

Our invention relates to sprayers of the type in which compressed air is utilized to displace liquid; and it has for one of its objects to provide an efficient sprayer of simple, inexpensive, and durable construction and one that is adapted to be handled and operated to the best advantage with facility.

Another object of the invention is the provision in a sprayer of improved means for controlling the discharge of the liquid spray.

Other advantageous features of the invention will be fully understood from the following description when the same is considered in connection with the accompanying drawings, forming part of this specification, in which—

Figure 1 is a side elevation of the sprayer constituting the present and preferred embodiment of our invention. Fig. 2 is a longitudinal vertical section of the same. Fig. 3 is a transverse section taken in the plane indicated by the line 3 3 of Fig. 2. Fig. 4 is an enlarged detail perspective showing the discharge-pipe of the sprayer and the valve-plug thereon, and Fig. 5 is a similar view of the lever for controlling the discharge of spray.

Similar letters designate corresponding parts in all of the views of the drawings, referring to which—

A is the tank of the sprayer, which is preferably of sheet metal and cylindrical in form. At one end the said tank is provided with a filling-aperture $a$, normally closed by a screw-plug $b$.

B is a pump-cylinder arranged longitudinally above the tank A and fixedly connected thereto through the medium of a brace $c$ and a tube $d$.

C is a piston movable in the cylinder and having a rod $e$ extending through the outer end thereof and terminating in a handle $f$, and D D are non-return valves, preferably of the ball type, controlling the passage intermediate the eduction-port of the pump-cylinder and the tank A and arranged to open toward the latter. When the piston C is reciprocated, air will obviously be forced from the cylinder B through the tube $d$ and into the tank A. This air is prevented from returning through the tube $d$ by the valves D, and hence it will operate, when the discharge-pipe of the sprayer is opened to the atmosphere, to displace the insecticide or other liquid previously placed in the tank through the filling-opening $a$.

E is a discharge-pipe extending from a point adjacent to the bottom of the tank through the top thereof and soldered or otherwise fixed to the inner end of the cylinder B. The said pipe is provided at its lower end with a strainer $g$, and at its upper end it terminates in a lateral valve-plug $h$. This plug is tapered toward its outer end and is provided at an intermediate point of its length with diametrically opposite discharge-apertures $i$. It also has its outer end reduced, as indicated by $k$, and is provided in said end with a thread for the engagement of the shank of a screw $m$, at the inner side of the head of which a coiled spring $n$ is arranged for a purpose presently set forth.

F is a lever for controlling the discharge of spray. This lever has a taper sleeve $p$, which is mounted on the plug $h$ between the shoulder $h'$ thereof and the spring $n$, so as to be subject to the pressure of said spring, and it also has a thumb-loop $r$ at its rear end, a suitable spray-nozzle $s$ at its forward end, and a passage $t$, communicating with the spray-nozzle and adapted to be moved into and out of register with the apertures $i$ in plug $h$, as will be presently more fully set forth. The lever lies slightly above and at the right of the forward portion of the pump-cylinder B, which constitutes a handhold, and hence the operator while grasping the said portion of the pump-cylinder with his left hand is enabled to place the thumb of that hand in the loop of the lever and conveniently rock the lever up and down, as occasion demands.

In the practical use of our novel sprayer the tank A is filled with insecticide or other liquid to be sprayed, and the pump-piston is actuated to charge the tank with the air under pressure. The operator then grasps the rear portion of the pump-cylinder B with his right hand and the forward portion of said cylinder with his left hand and places the thumb of the latter hand in the loop of the lever F. With this done the operator is enabled to direct the forward end of the sprayer up or down and otherwise handle the sprayer with great facility and convenience, and he is also enabled by merely manipulating his left thumb to establish the supply of liquid to the spray-nozzle and cut off such supply. The best practice is to raise and lower the thumb at each plant to be sprayed, since this regulates the amount of spray for each plant. When it is desired to throw spray up under shrubbery or the like, the lever is turned down or reversed, so as to enable its passage *t* to receive from the rear aperture *i* of the plug *h*.

The extension of the pump-cylinder B a considerable distance beyond the rear end of the tank A, as shown in Figs. 1 and 2, is materially advantageous, for the reason that the extended portion of the cylinder constitutes a good hold for the right hand of the operator and enables him to readily direct the forward end of the sprayer down or up, as desired.

Having thus described our invention, what is claimed, and desired to be secured by Letters Patent, is—

1. In a sprayer of the class described, the combination with a tank and a pump supporting said tank and arranged to constitute a handhold, of a discharge-pipe extending from the tank contiguous to one end of the pump, and a valve device supported by the exterior end of the discharge-pipe and comprising relatively fixed and movable ported valve members, one of which is fitted directly to the pipe, a discharge-nozzle carried by one of the valve members and an operating-lever also carried by one of the valve members and arranged contiguous to the handhold portion of the pump.

2. In a sprayer of the class described, the combination with a tank and a pump supporting said tank and arranged to constitute a handhold, of a discharge-pipe extending from the tank alongside of one end of the pump and provided with a rigid laterally-deflected portion, and a valve device supported by the terminal of said laterally-deflected portion of the pipe and having a movable valve member provided with an operating-lever arranged contiguous to the handhold.

3. In a sprayer of the class described, the combination with a tank, and a pump supporting the tank and constituting a handhold therefor, of a discharge-pipe extending from the tank and provided with an exterior laterally-deflected portion, a ported valve-seat carried by the laterally-deflected pipe portion, and a rocking valve-body member mounted on said seat and carrying at one side a nozzle, and at the directly opposite side an operating-handle arranged contiguous to the handhold portion of the pump.

4. In a sprayer of the class described, the combination with a tank, and a pump supporting the tank, of a discharge-pipe extended from the tank alongside of one end of the pump, a fixed valve-plug arranged on the external extremity of said pipe, and a valve-sleeve journaled on said plug and provided at one side of its axis with a spray-nozzle, and at the directly opposite side of its axis with an operating-lever arranged at one side of the handhold portion of the pump.

5. In a sprayer of the class described, the combination with the tank and the pump, of a discharge-pipe extended from the tank contiguous to the handle portion of the pump, a taper valve-seat plug rigidly fitted to the external end of said pipe and provided with a discharge-aperture, and a rocking taper sleeve constituting a valve-body fulcrumed on said plug and carrying at one side a discharging-nozzle and at its directly opposite side provided with a handle located contiguous to the handhold portion of the pump.

In testimony whereof we affix our signatures in presence of two witnesses.

CLARENCE W. PARKS.
    AGNES E. PARKS.

Witnesses:
 MYRTIE A. TAYLOR,
 S. P. HICKS.